(12) United States Patent
Hanna et al.

(10) Patent No.: US 8,707,819 B2
(45) Date of Patent: Apr. 29, 2014

(54) PARKING BRAKE

(75) Inventors: Ronald J. Hanna, Mancelona, MI (US);
Brooke Elsener, East Jordan, MI (US);
Jeremy Gill, Jacksonville, FL (US)

(73) Assignee: Dura Operating LLC, Auburn Hills, MI (US)

( * ) Notice: Subject to any disclaimer, the term of this patent is extended or adjusted under 35 U.S.C. 154(b) by 683 days.

(21) Appl. No.: 11/562,686

(22) Filed: Nov. 22, 2006

(65) Prior Publication Data

US 2008/0115618 A1  May 22, 2008

(51) Int. Cl.
*G05G 1/30* (2008.04)
(52) U.S. Cl.
USPC .................................................. 74/512
(58) Field of Classification Search
USPC ............ 74/473.16, 473.3, 52, 513, 519, 527, 74/539, 560, 575, 512
See application file for complete search history.

(56) References Cited

U.S. PATENT DOCUMENTS

| | | | | |
|---|---|---|---|---|
| 2,467,557 A * | 4/1949 | Jandus | ............................ | 74/535 |
| 3,861,237 A * | 1/1975 | Mounts | ............................ | 74/516 |
| 3,929,033 A * | 12/1975 | Marx | ............................ | 74/512 |
| 4,364,284 A * | 12/1982 | Tani et al. | ........................ | 74/540 |
| 4,441,380 A * | 4/1984 | Kawaguchi et al. | ............ | 74/512 |
| 4,597,307 A * | 7/1986 | Kawaguchi et al. | ............ | 74/512 |
| 5,832,784 A * | 11/1998 | McCallips et al. | .............. | 74/512 |
| 2008/0116022 A1 * | 5/2008 | Hanna et al. | ............... | 188/79.54 |

* cited by examiner

*Primary Examiner* — Vicky Johnson
(74) *Attorney, Agent, or Firm* — Gifford Krass P.C.; Kevin S. Mackenzie; Dean B. Watson

(57) ABSTRACT

A park brake includes a brake lever that is movable about a pivot. A release mechanism is associated with the brake lever. The release mechanism is actuable for allowing selective movement of the brake lever. A cable is connected to the release mechanism. The cable is isolated from movement of the brake lever.

28 Claims, 7 Drawing Sheets

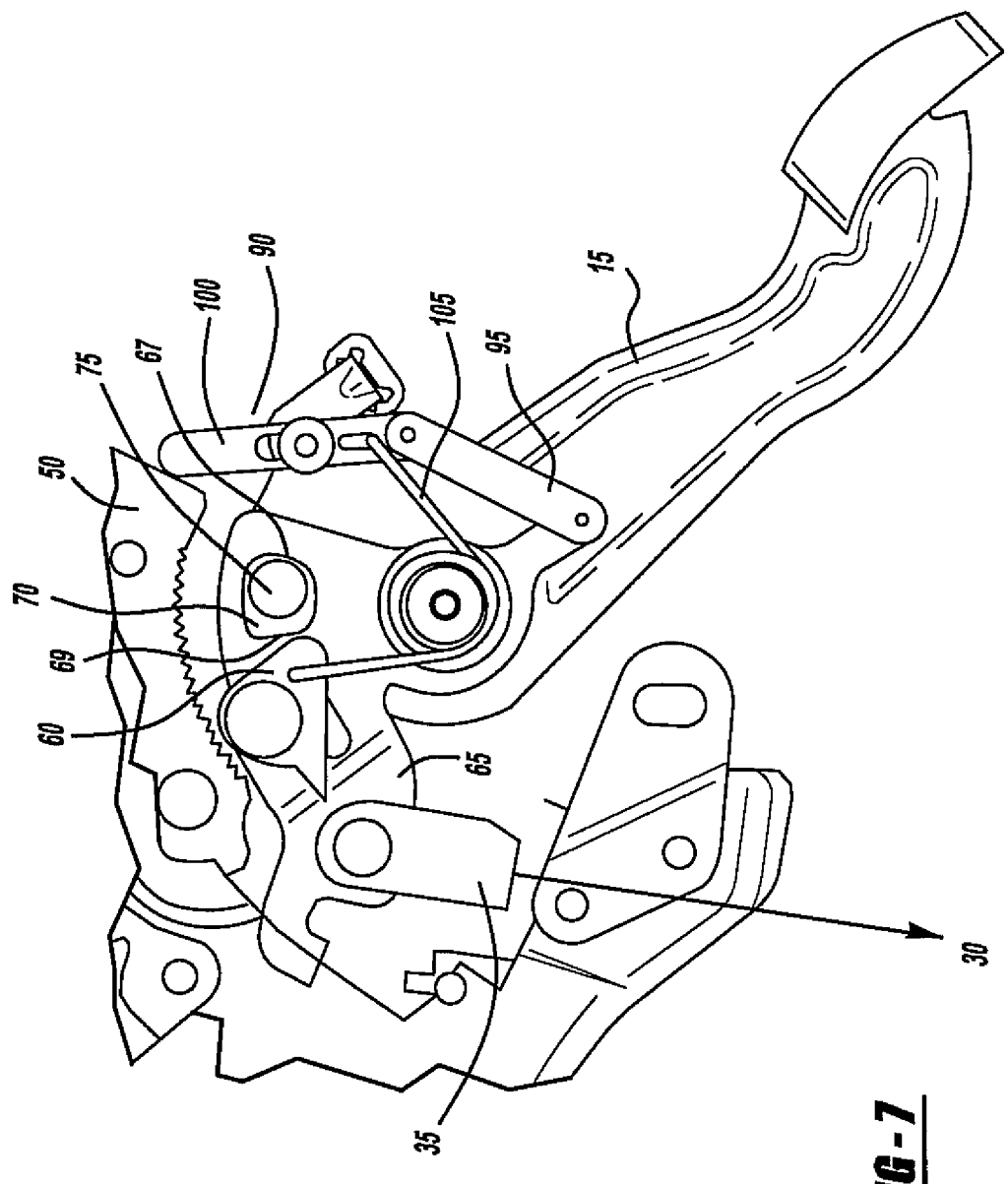

PARKING BRAKE

FIELD OF THE INVENTION

The invention relates to automotive parking brakes.

BACKGROUND OF THE INVENTION

Parking brake assemblies are known in the art and may include various mechanisms for locking and unlocking the parking brake. An example of one system includes a pawl and sector design wherein a pawl engages and disengages a sector to allow movement of a parking brake from a locked to an unlocked position. A cable that is associated or attached to the brake lever may display cable travel loss when the parking brake is moved between the locked and unlocked positions. On push to release brakes, this travel loss may be caused by sector tooth geometries, as well as travel of various components of the brake.

There is therefore a need in the art for an improved parking brake that limits the amount of cable travel loss.

SUMMARY OF THE INVENTION

In one aspect, a park brake includes a brake lever that is movable about a pivot. A release mechanism is associated with the brake lever. The release mechanism is actuable for allowing selective movement of the brake lever. A cable is connected to the release mechanism. The cable is isolated from movement of the brake lever.

In another aspect, a park brake includes a brake lever that is movable about a pivot. A release mechanism is associated with the brake lever. The release mechanism includes a linkage. The linkage is movable from a starting position to a cam over position for locking and releasing the release mechanism.

In another aspect, a park brake includes a brake lever that is movable about a pivot. A release mechanism is associated with the brake lever. The release mechanism includes a lost motion feature decoupling the release mechanism from the brake lever.

BRIEF DESCRIPTION OF THE DRAWINGS

FIG. 7 is a partial side view of a park brake in a recock position.

DETAILED DESCRIPTION OF THE PREFERRED EMBODIMENTS

Figure 1:
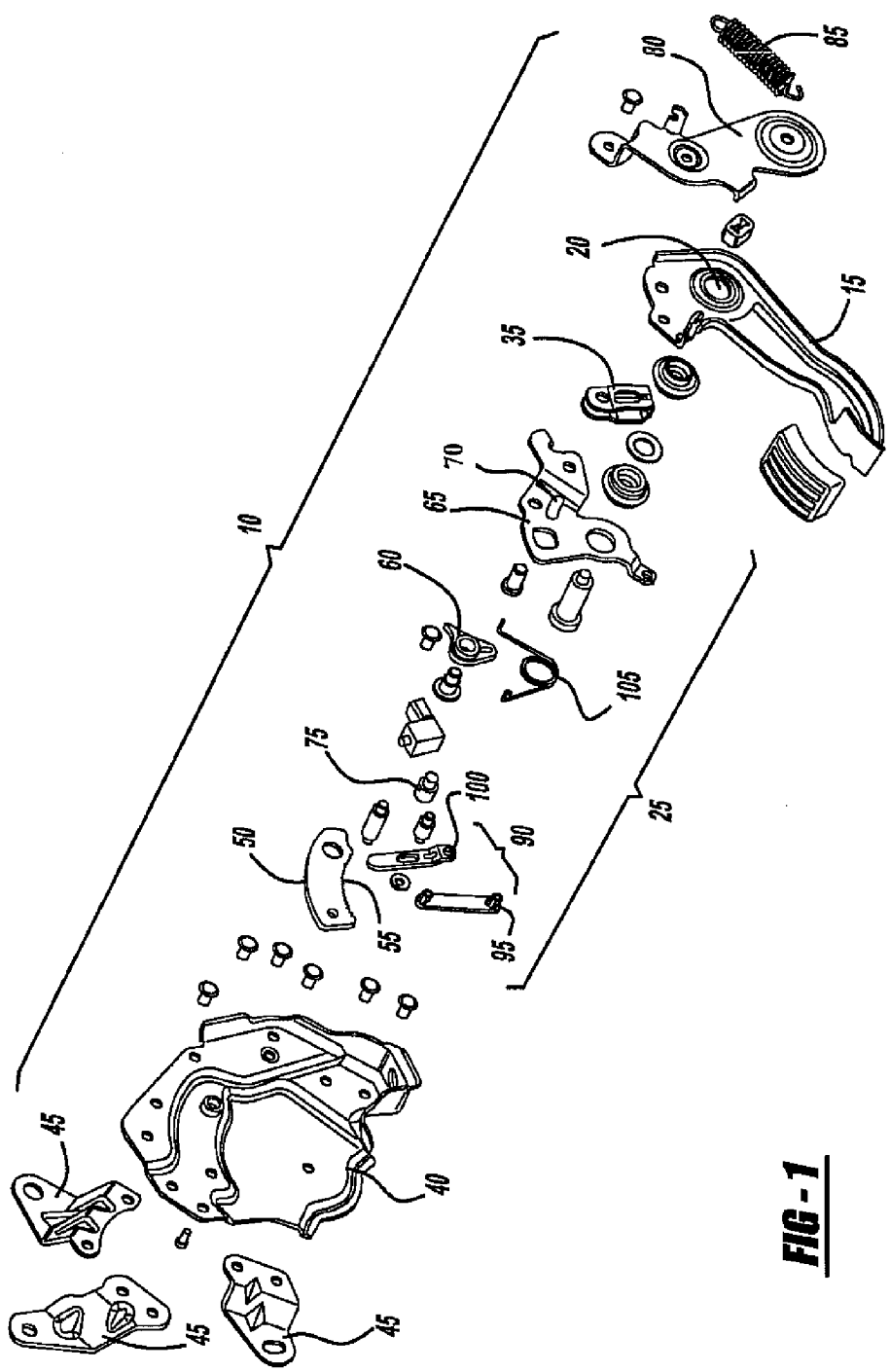
FIG. 1 is an exploded assembly view of a park brake.

Referring to FIG. 1, there is shown a park brake 10. The park brake 10 includes a brake lever 15 that is movable about a pivot 20. A release mechanism 25 is associated with the brake lever 15. The release mechanism 25 is actuable to allow selective movement of the brake lever 15. A cable 30 is connected to the release mechanism 25. The cable 30 is isolated from movement of the brake lever 15. The cable 30 may be connected to the release mechanism 25 at a clevis 35, as shown in FIG. 1 or it may alternatively be attached using any other suitable connection mechanism. Isolation of the cable 30 from movement of the brake lever 15 allows the release mechanism 25 to move independent of the brake lever 15 to minimize cable travel loss.

As stated above, the brake lever 15 is movable about a pivot 20 that is coupled to a housing 40. The housing 40 may include a shape having various detents and contours formed thereon to define an overall travel path of a brake lever 15. The housing 40 may be attached to a vehicle using attachment brackets 45. Additionally the housing 40 may include various slots and attachment members for connecting with the various components, as will be described in more detail below.

A sector 50 is attached to the housing. The sector 50 may have an arcuate shape with a plurality of teeth 55 formed thereon for engaging a pawl 60. The teeth 55 may be positioned relative to each other and to the overall shape of the sector 50 to achieve various design characteristics. The teeth 55 may have a root-to-tip distance designed to minimize travel loss. The design parameters of the sector 50 allow for the pawl 60 to contact and lock with the sector 50 to minimize cable travel loss in the park brake 10.

The park brake 10 includes a pawl plate 65 that is movable about the pivot 20 and contacts the brake lever 15. The pawl plate 65 includes the pawl 60 that is adapted to contact and lock with the sector 50. The pawl plate 65 includes a lost motion slot 70 formed therein. A rivet 75 associated with the brake lever 15 is positioned within the lost motion slot 70 and is movable within the lost motion slot 70 allowing for independent movement of the brake lever 15 and the pawl plate 65 decoupling the release mechanism 25 from the brake lever 15.

It should be realized that alternative members other than the rivet 75 may be utilized including a boss, projection, block or other such structure associated with the brake lever 15.

The park brake 10 may also include a cover 80 disposed about the pivot 20. The cover 80 may include a return spring 85 attached thereto. The first end of the return spring 85 may be attached to the cover 80 while the second end may be attached to the brake lever 15 for returning the brake lever 15 to a nominal or starting position after it has been moved to an applied position.

A linkage 90 may be connected to the pawl plate 65 and the brake lever 15. The linkage 90 may include first and second links 95, 100 with the first link 95 attached to the pawl plate 65 at one end and to the second link 100 at a second end. The second link 100 may be coupled to the brake lever 15. It should be realized that alternative linkages other than that disclosed and shown in FIG. 1 may be utilized. A spring member 105 having a first end attached to the pawl 60 and a second end attached to the second link 100 is disposed about the pivot 20. The linkage 90 is movable from a starting position to a cam over position when the pawl 60 locks with the sector 50, as will be discussed in more detail below. The spring member 105 translates between a compression and free state in response to cam over of the linkage 90. Additionally, the spring member 105 translates between the free state to a tension state in response to a force applied to the brake lever 15, again as will be discussed in more detail below.

Figure 2:
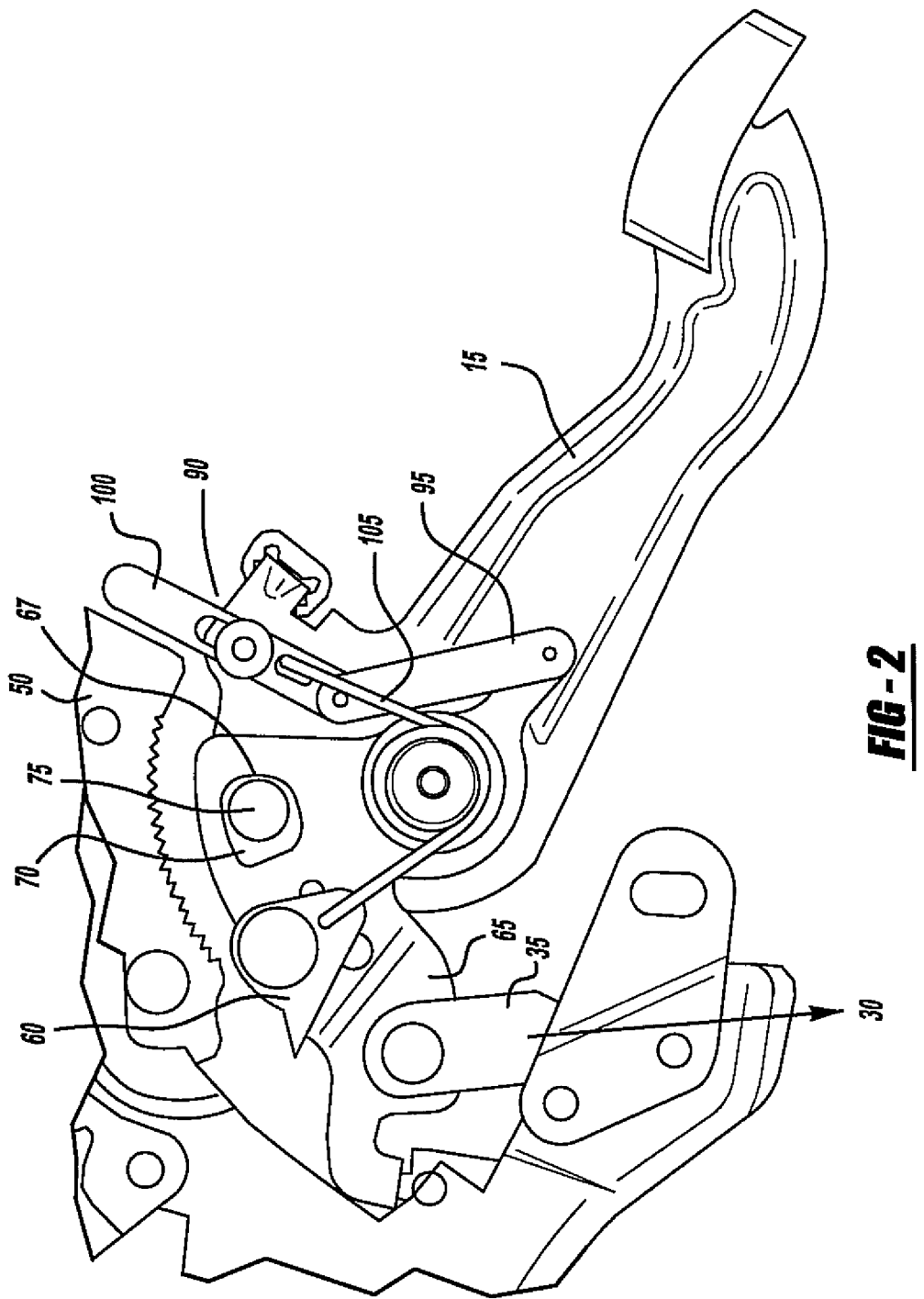
FIG. 2 is a partial side view of a park brake in a fully released position.

In use, the park brake 10 starts in a nominal position wherein the release mechanism is fully released, as shown in FIG. 2. As can be seen in the figure, the linkage 90 is located in a starting position wherein the links 95, 100 are located toward the left side of the figure in response to a radial preload force and/or a recock mechanism as will be described in more detail below. The spring member 105 is in a free-state position. The rivet 75 associated with the brake lever 15 is positioned within the lost motion slot 70 formed on the pawl plate 65. The rivet 75 is positioned toward the right in the figure and contacts a first end 67 of the lost motion slot 70 in response to an opposing cable load applied by the cable 30 at the clevis 35 which is attached to the pawl plate 65.

Figure 3:
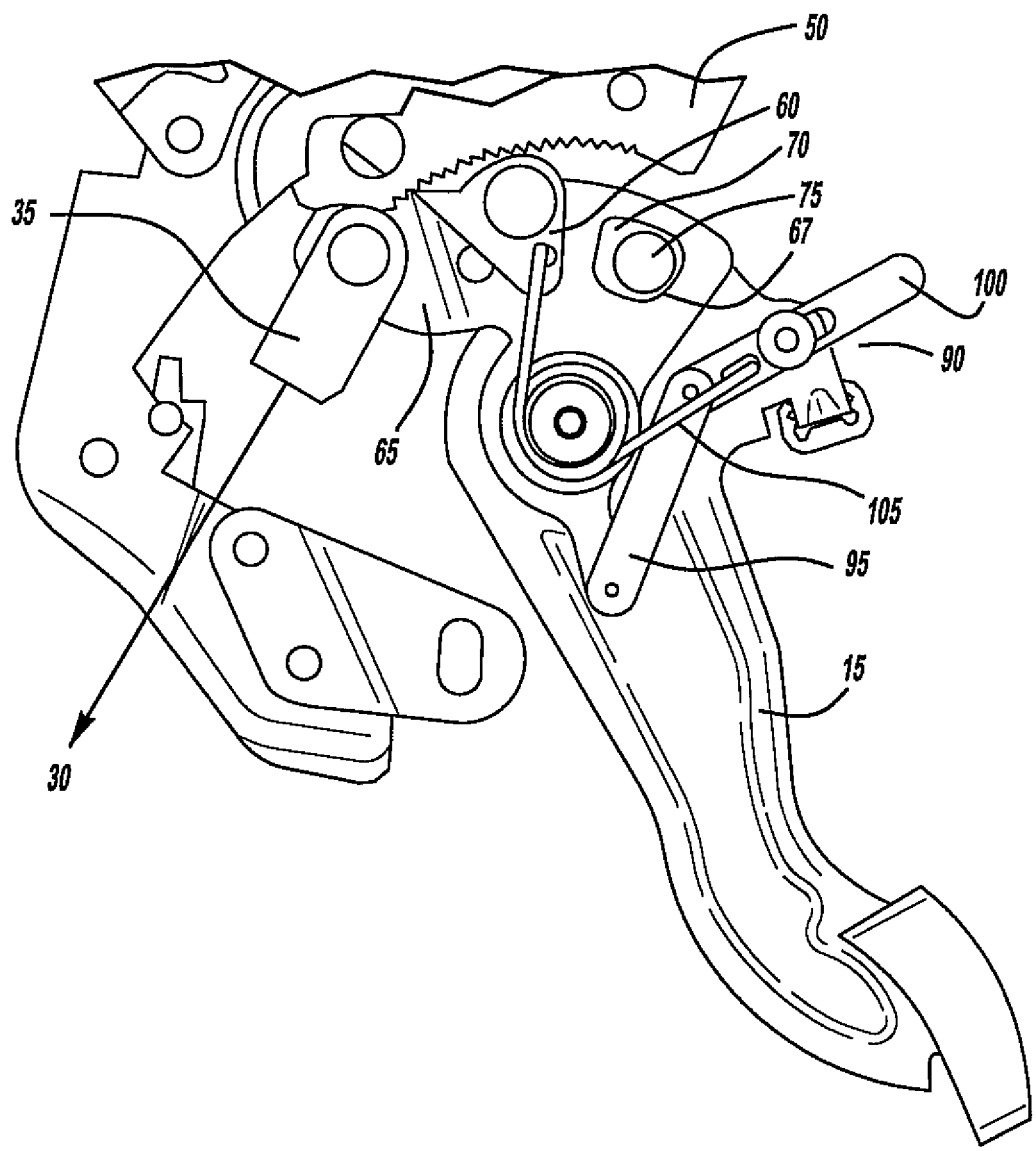
FIG. 3 is a partial side view of a park brake in an applying position.

When an operator applies a positive force on the brake lever 15, the park brake 10 is in an applying position, as shown in FIG. 3. The force applied to the brake lever 15 causes rotation of the brake lever 15 about the pivot 20. The rivet 75 associated with the brake lever 15 contacts the first end 67 of the lost motion slot 70 such that the force applied to the brake lever 15 causes the pawl plate 65 to move about the pivot 20. The linkage 90 remains positioned in the starting position toward the left due to a binding force at the reference circle intersections, as shown in FIG. 3. The pawl 60 connected to the pawl plate 65 contacts a surface on the sector 50 and applies a compression to the spring member 105 due to the increased positive rotation of the pawl 60 on the sector 50 surface.

Figure 4:
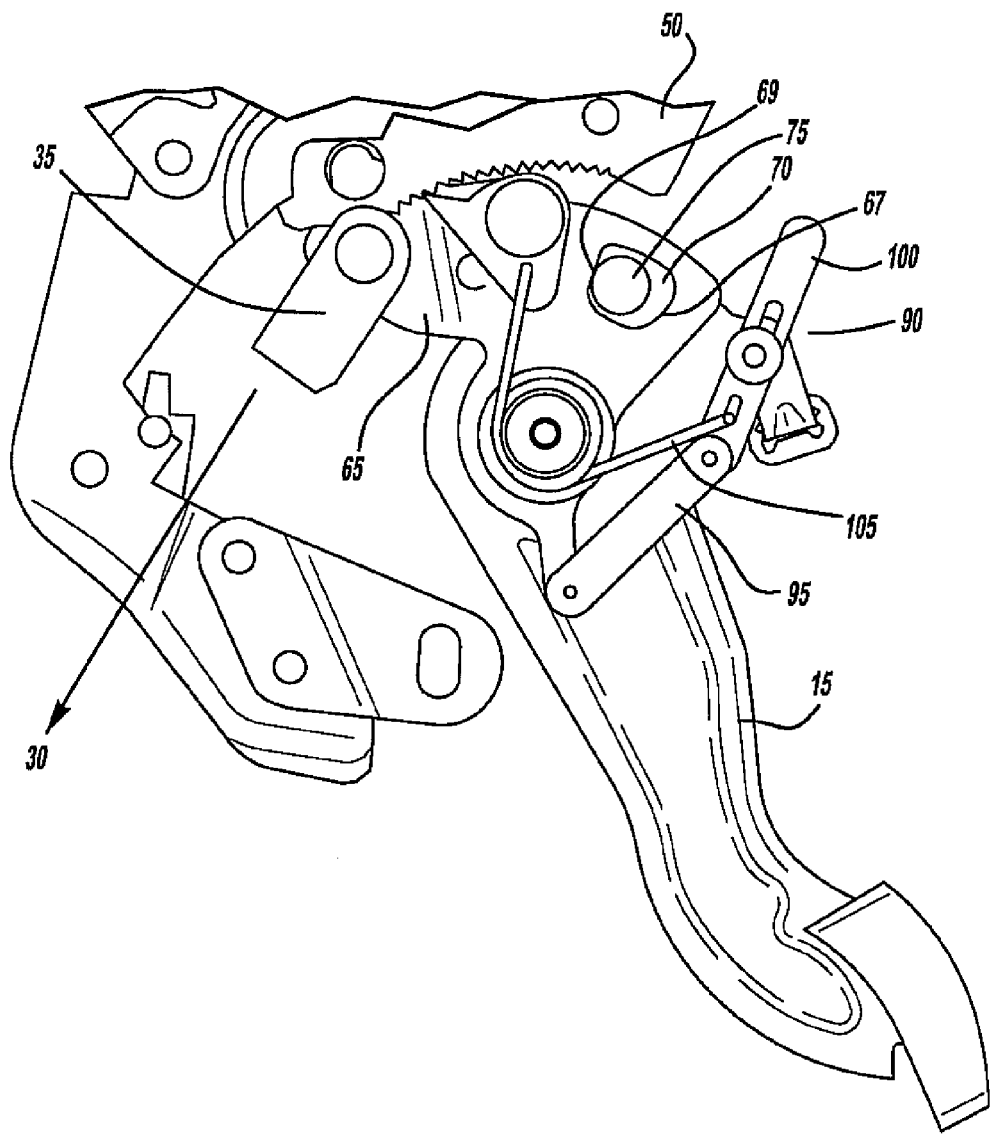
FIG. 4 is a partial side view of a park brake in a locked position.

When the force is removed from the brake lever 15, the park brake 10 is then in the locked position, as shown in FIG. 4. In the locked position, the pawl 60 locks with the sector 50 such that all opposing cable load is removed from the rivet 75 associated with the brake lever 15 and applied to the pawl 60. The rivet 75 associated with the brake lever 15 is translated towards the left in the figure towards an opposing end 69 of the lost motion slot 70 in response to the return spring 85 that is attached to the brake lever 15 at one end and the cover 80 at another end. The linkage 90 moves to the cam over position such that the linkage moves to the right in the figure due to the transfer of the load from the rivet 75 associated with the brake lever 15 to the pawl 60. In this manner, the compression within the spring member 105 causes the linkage 90 to cam over such that the spring member 105 returns to a free-state position. In the locked position, the pawl 60 is locked with the sector 50 and the brake lever 15 is moved from the nominal or starting position to the applied position.

Figure 5:
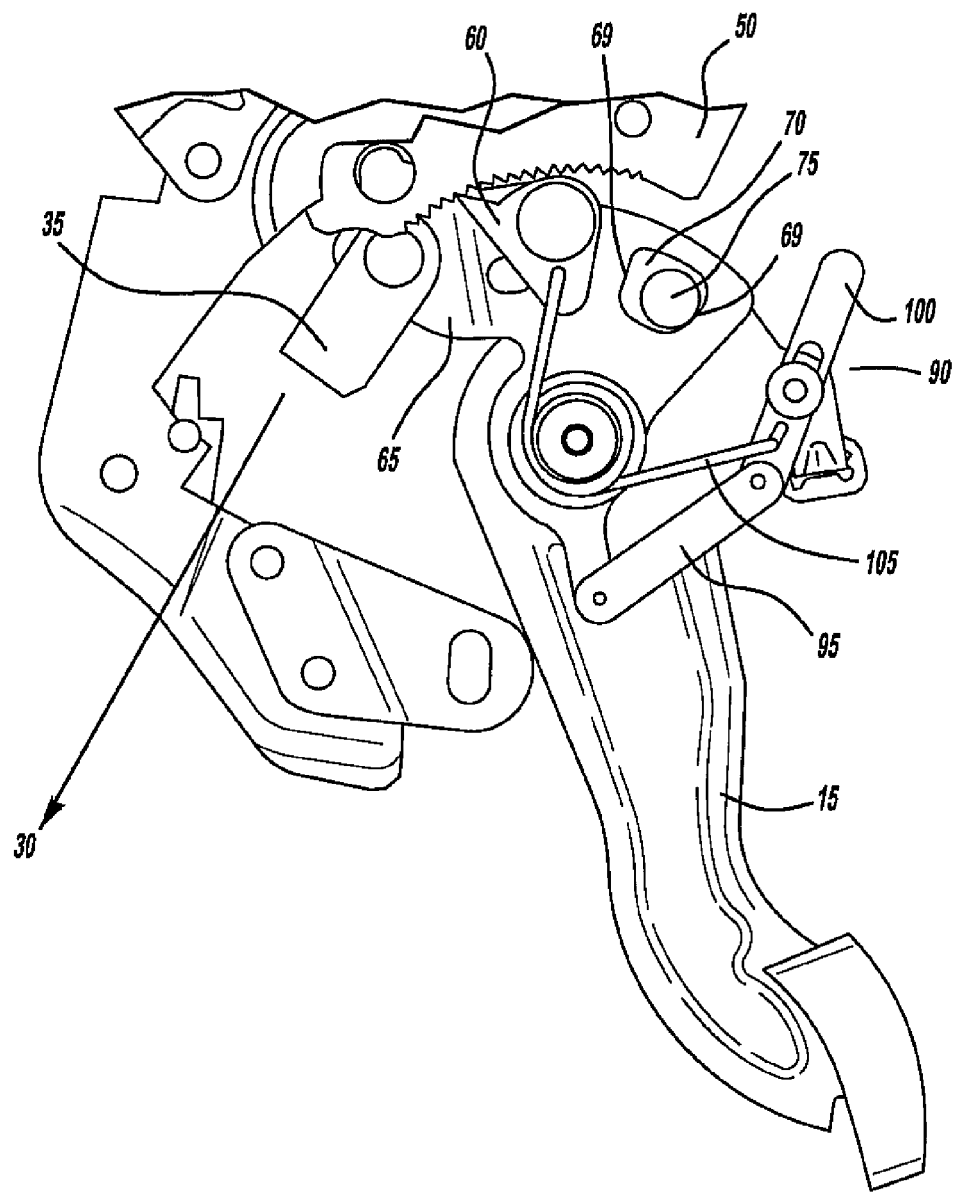
FIG. 5 is a partial side view of a park brake in a reapplied position.

To release the brake lever 15 from the applied position where the release mechanism is locked, a force is reapplied to the brake lever 15 as shown in FIG. 5. As can be seen in the figure, the linkage 90 is in the cam over position and the rivet 75 associated with the brake lever 15 is translated towards the right in the figure to contact the first end 67 of the lost motion slot 70 formed in the pawl plate 65. The load that has been applied to the pawl 60 when engaging the sector 50 is removed from the pawl 60 and sector 50 and is again applied to the rivet 75 contacting the first end 67 of the lost motion slot 70. The spring member 105 of the release mechanism 25 has a tension load applied to it. The tension load causes a negative rotation of the pawl 60 disengaging the pawl 60 from the sector 50. The linkage 90 remains in the cam over position.

Figure 6:
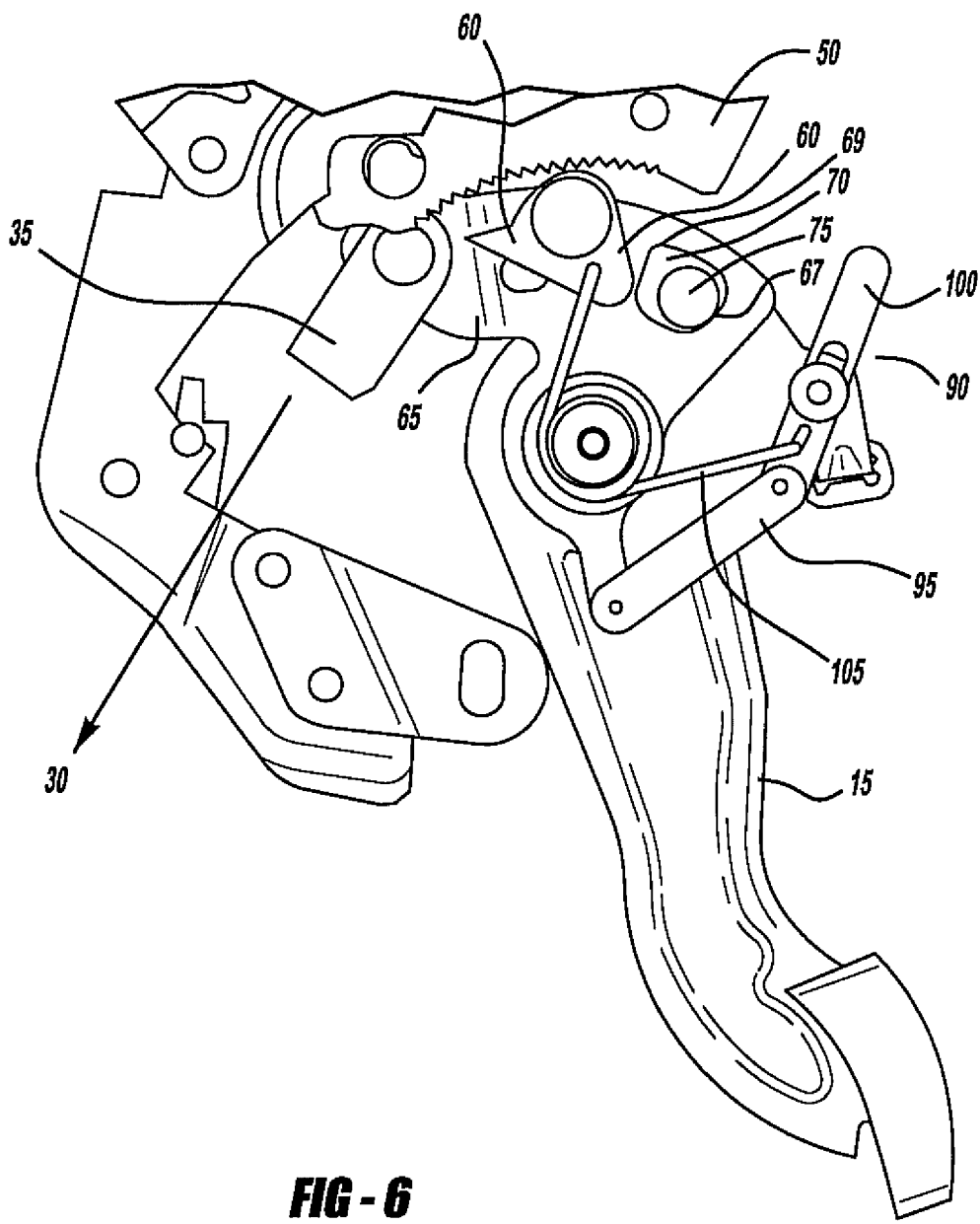
FIG. 6 is a partial side view of a park brake in a releasing position.

The force reapplied to the brake lever 15 is then removed allowing the park brake 10 to move to the releasing position, shown in FIG. 6. In the releasing position, the return spring 85 exerts a force on the brake lever 15 to return the brake lever 15 to the nominal or starting position. The linkage 90 remains positioned in the cam over position towards tie right in the figure. The tension force on the spring member 105 has caused the negative rotation of the pawl 60 relative to the sector 50 to disengage the pawl 60 from the sector 50 returning the spring member 105 to a free state. In the releasing position, the pawl 60 no longer engages the sector 50 and the brake lever 15 is free to move from the applied position toward the nominal position.

The brake lever 15 continues to travel towards the nominal position in response to the force applied by the return spring 85. As the brake lever 15 continues its travel toward the nominal position, the linkage 90 contacts the sector 50 in a recock position, as shown in FIG. 7. While the linkage 90 contacts the sector 50 in the depicted embodiment, it should be realized that the linkage 90 may contact any fixed member, such as a bracket, extension or other fixed member. In the recock position, the linkage 90 contacts the sector 50 with the second link 100 having a point-to-point contact with the sector 50 such that the linkage 90 is moved to the starting position from the cam over position, as the force applied by the return spring 85 causes the linkage 90 to move back over center to the starting position. Once the linkage 90 has moved fully over center, the park brake 10 is now positioned in the fully released position with the brake lever 15 in the nominal position.

The park brake 10 described herein reduces cable travel loss from the independent movement of the release mechanism 25 and brake lever 15. Additionally, cable travel loss is minimized utilizing a sector 50 and pawl 60 with the sector 50 designed with a plurality of teeth 55 having optimized design characteristics. Cable travel loss from 0.1 millimeters to 1.5 millimeters may be achieved utilizing the park brake 10 as described herein.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A park brake comprising:
a brake lever movable about a pivot;
a release mechanism associated with the brake lever, the release mechanism actuable for allowing selective movement of the brake lever, the release mechanism including a linkage connected to a pawl plate and brake lever wherein the linkage includes first and second links, the first link attached to the pawl plate at one end and including a common pivot linking the first link to the second link at a second end, the second link coupled to the brake lever and wherein the linkage moves between a starting position with the linkage positioned on a first side relative to a center of the linkage and a cam over position with the linkage positioned on a second opposing side of center for locking and releasing the release mechanism;
a cable connected to the release mechanism;
wherein the cable is isolated from movement of the brake lever.

2. The park brake of claim 1 wherein the brake lever includes a rivet associated therewith and the pivot is coupled to a housing.

3. The park brake of claim 2 including a sector attached to the housing.

4. The park brake of claim 3 wherein the pawl plate is movable about the pivot and contacts the brake lever.

5. The park brake of claim 4 including a pawl connected to the pawl plate, the pawl adapted to contact and lock with the sector.

6. The park brake of claim 5 including a spring member having a first end attached to the pawl and a second end attached to the second link.

7. The park brake of claim 6 wherein the spring member translates between a compression and a free state in response to cam over of the linkage.

8. The park brake of claim 7 wherein the spring member translates between the free state to a tension state in response to a force applied to the brake lever.

9. The park brake of claim 8 wherein the pawl unlocks from the sector in response to the tension state of the spring member.

10. The park brake of claim 4 wherein the pawl plate includes a lost motion slot, the rivet associated with the brake lever positioned within the lost motion slot and movable within the lost motion slot for allowing independent movement of the brake lever and the pawl plate.

11. The park brake of claim 1 including a return spring attached to the brake pedal at one of the return spring and to a cover plate at another end of the return spring.

12. A park brake comprising:
a brake lever movable about a pivot;
a release mechanism associated with the brake lever, the release mechanism including a linkage, the linkage including first and second links having a common pivot linking the first link to the second link;
wherein the linkage is movable from a starting position with the linkage positioned on a first side relative to a center of the linkage to a cam over position with the linkage positioned on a second opposing side of center for locking and releasing the release mechanism.

13. The park brake of claim 12 wherein the linkage includes a spring member that translates between compression, free and tension states in response to cam over of the linkage.

14. The park brake of claim 12 including a cable connected to the release mechanism, the cable applying a force to the release mechanism.

15. The park brake of claim 12 wherein the release mechanism includes a pawl plate contacting the brake lever, the pawl plate having a pawl adapted to contact a sector attached to a housing.

16. The park brake of claim 15 wherein the brake lever includes a rivet associated therewith and the pivot is coupled to a housing.

17. The park brake of claim 16 wherein the pawl plate includes a lost motion slot, the rivet associated with the brake lever positioned within the lost motion slot.

18. The park brake of claim 17 wherein the linkage is in the starting position and the rivet contacts a first end of the lost motion slot wherein a force applied to the brake lever causes the pawl to contact the sector applying a compression to the spring member of the linkage.

19. The park brake of claim 18 wherein the force is removed from the brake lever and the pawl locks with the sector and the rivet associated with the brake lever moves to an opposing end of the lost motion slot in response to a return spring wherein the cable force is removed from the rivet and applied to the pawl wherein the linkage mechanism moves to the cam over position removing the compression from the spring member.

20. The park brake of claim 19 wherein a force is reapplied to the brake lever and the linkage is in the cam over position and the rivet on the brake lever contacts the first end of the lost motion slot and the spring member is moved to a tension state causing the pawl to disengage from the sector.

21. The park brake of claim 20 wherein the reapplied force is removed from the brake lever and the linkage is in the cam over position and the brake lever rotates in response to the return spring wherein the linkage contacts the sector moving the linkage to the starting position.

22. A park brake comprising:
a brake lever movable about a pivot;
a release mechanism associated with the brake lever, the release mechanism including a linkage, the linkage including first and second links having a common pivot linking the first link to the second link, the linkage movable from a starting position with the linkage positioned on a first side relative to a center of the linkage to a cam over position with the linkage positioned on a second opposing side of center for locking and releasing the release mechanism,
wherein the release mechanism includes a lost motion feature decoupling the release mechanism from the brake lever.

23. The park brake of claim 22 wherein the release mechanism includes a pawl plate contacting the brake lever, the pawl plate having a pawl adapted to contact a sector attached to a housing.

24. The park brake of claim 23 wherein the brake lever includes a rivet associated therewith and the pivot is coupled to a housing.

25. The park brake of claim 24 wherein the pawl plate includes a lost motion slot formed therein, the rivet associated with the brake lever positioned within the lost motion slot.

26. The park brake of claim 22 wherein the linkage includes a spring member that translates between compression, free and tension states in response to cam over of the linkage.

27. The park brake of claim 22 including a cable attached to the release mechanism wherein cable travel loss is minimized.

28. The park brake of claim 27 wherein cable travel loss is from 0.1 to 1.5 millimeters.

* * * * *